Aug. 4, 1964
G. E. KOESTER ETAL
3,143,025
SHEARING DEVICE WITH SHEAR BLADES HAVING
REMOVABLE SHEARING INSERTS
Filed March 26, 1962
3 Sheets-Sheet 1
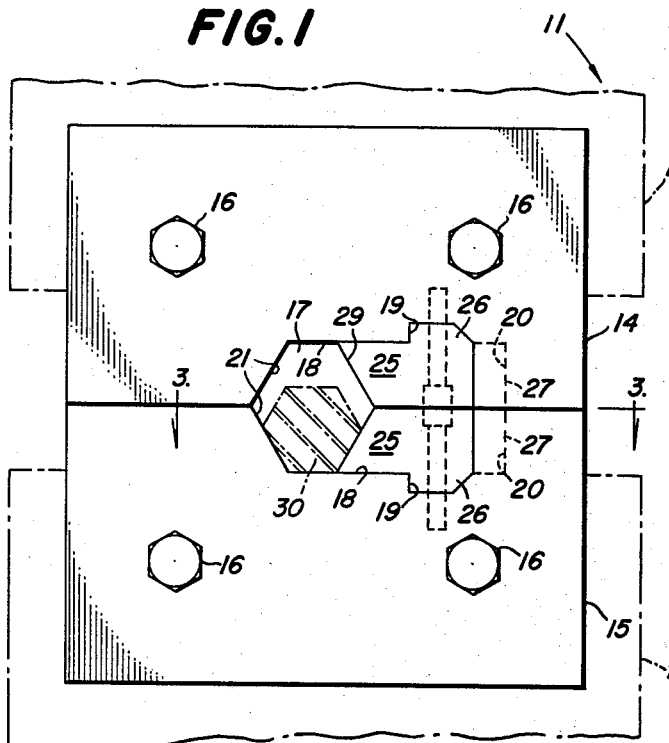
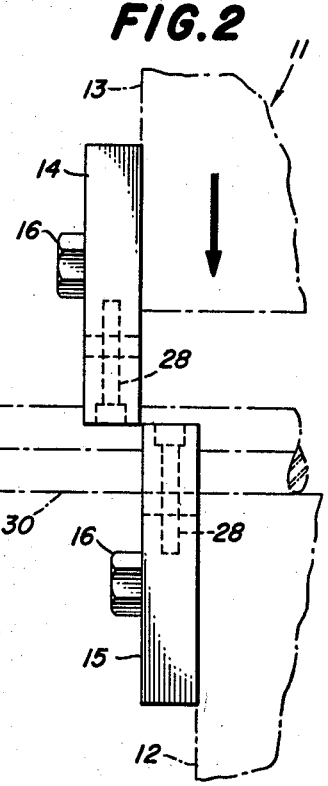
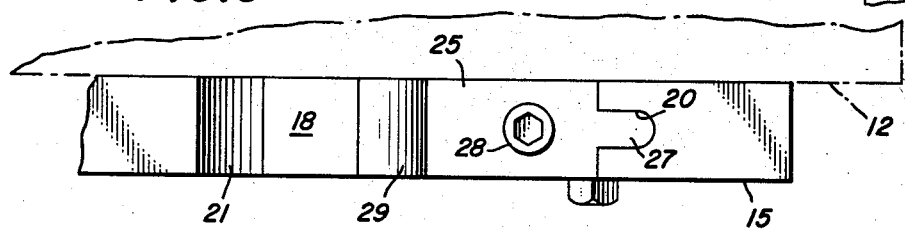
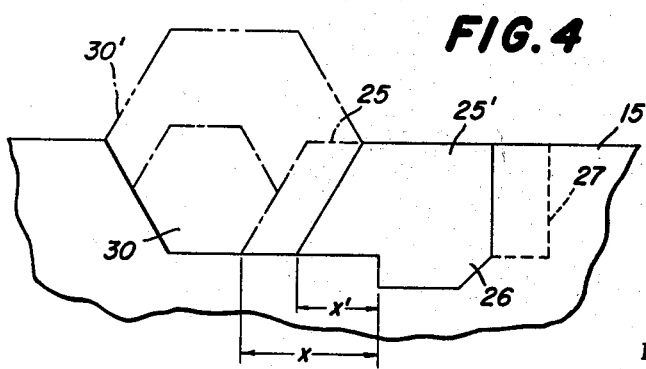
INVENTORS
GORDON E. KOESTER
JOSEPH H. PANNY
BY
Paul O. Pippel
ATTYS.

Aug. 4, 1964

G. E. KOESTER ETAL 3,143,025

SHEARING DEVICE WITH SHEAR BLADES HAVING
REMOVABLE SHEARING INSERTS

Filed March 26, 1962

INVENTORS
GORDON E. KOESTER
JOSEPH H. PANNY
BY
Paul O. Pippee
ATTYS.

Aug. 4, 1964

G. E. KOESTER ETAL 3,143,025

SHEARING DEVICE WITH SHEAR BLADES HAVING
REMOVABLE SHEARING INSERTS

Filed March 26, 1962

INVENTORS
GORDON E. KOESTER
JOSEPH H. PANNY
BY
Paul O. Pippel
ATTYS.

United States Patent Office 3,143,025
Patented Aug. 4, 1964

---

3,143,025
SHEARING DEVICE WITH SHEAR BLADES HAVING REMOVABLE SHEARING INSERTS
Gordon E. Koester, 545 W. 129th Place, and Joseph H. Panny, 7701 S. Morgan St., both of Chicago, Ill.
Filed Mar. 26, 1962, Ser. No. 182,347
2 Claims. (Cl. 83—641)

This invention relates in general to devices for shearing bar stock or the like, and more particularly to a novel blade structure for a shearing press.

It has been well known to employ shearing presses to cut bar stock or the like to the desired length. Prior art devices consisted essentially of a lower knife member fixedly secured to the bed of a hydraulic or mechanical press, and an upper knife member fixedly secured to a slide vertically movable with respect to the bed. The knives were arranged so that upon movement of the slide with respect to the bed the upper knife member would pass closely adjacent to the lower knife member and shear the bar stock. While such devices have in general served the purpose, they have not proven entirely satisfactory under all operating conditions. For example, when cutting large diameter stock on a fixed capacity press, it has been noted that the stock exhibits a tendency to flatten out or deform laterally during the shearing operation. Also, it has been found that when shearing bar stock of a relatively high hardness, compared to the hardness of the shear knives, a ragged or uneven juncture is created at the shearing surface. Another problem that was noted in the use of prior art devices was that the high impact stresses, necessitated by the shearing operation, caused a high degree of failure in the knife members themselves. The general purpose of the present invention is therefore to provide a shearing device which will shear bar stock without deforming the sheared end, and without destroying the shearing knives. To attain this, the present invention contemplates the use of the novel cut-out and insert arrangement in the knife members.

An object of the present invention is the provision of means for laterally constraining the stock being sheared to prevent deformation during the shearing operation.

Another object of the invention is to provide removable means for aligning the stock in proper shearing relation to the knife members.

A further object of the invention is the provision of novel insert means which will enable the shearing device to accommodate stock of different sizes.

A still further object of the invention is the provision of a shearing device which will cut a plurality of bars during one stroke of the shearing press.

Other objects and advantages of the invention will hereinafter become more fully apparent from the following description and the annexed drawings wherein:

FIGURE 1 is a front elevational view of one embodiment of the present invention;

FIGURE 2 is a side elevational view of FIGURE 1;

FIGURE 3 is a view taken along line 3—3 of FIGURE 1 with the bar stock removed;

FIGURE 4 is a front elevational detail view on an enlarged scale, similar to FIGURE 1, showing a novel feature of the present invention;

Figure 5:
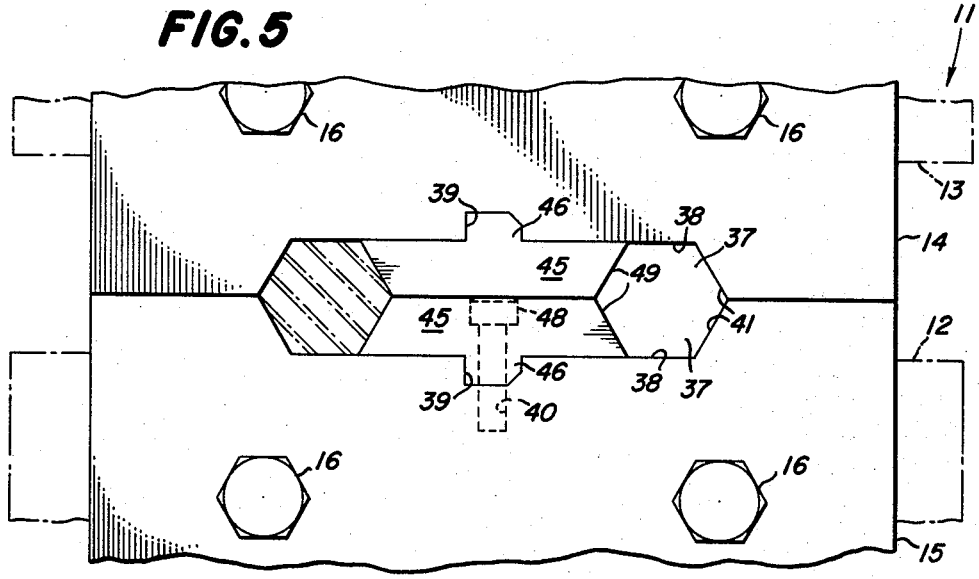
FIGURE 5 is a front elevational view of another embodiment of the present invention.

Referring now to the drawings wherein like reference characters designate like or corresponding parts throughout the several views, there is shown in the drawings a shearing press indicated in its entirety by reference numeral 11. While the present invention may be practiced on any type of press, for purposes of illustration, it is shown in the present application with a press having a stationary bed 12 and a movable slide 13. Upper and lower knife members 14 and 15 are fixedly and rigidly secured to slide 13 and bed 12 respectively by bolts 16 or the like.

The embodiment of the invention shown in FIGURES 1–4 sets forth a shearing device adapted to shear a single bar of hexagonal stock. Upper and lower knife members 14 and 15 each contain identical cut-out, oppositely directed portions 17 in their bar stock engaging surfaces. Each cut-out portion 17 includes a substantially flat area 18, a recessed portion 19, and a groove 20. At the end of each cut-out portion opposite of groove 20, a face 21 is provided which is disposed at an angle of 60° with respect to flat area 18.

An insert 25 is removably mounted in each knife member cut-out portion 17. Each insert 25 has a depending portion 26 seated in recess 19, and a projection 27 seated in groove 20. Each insert 25 is securely, yet removably, mounted in cut-out portion 17 by a socket head set screw 28 or the equivalent. The shearing end of each insert 25, which is opposite from projection 27, is provided with a face 29 that is disposed at an angle of 60° to flat area 18. It should be understood that the engagement of depending portion 26 with recess 19 prevents the inserts 25 from moving longitudinally of the cut-out portion 17, and that the cooperation of projection 27 and set screw 28 prevents the insert from moving laterally across each knife member.

From the examination of FIGURE 1 and FIGURE 2 it will be observed that the flat area 18 of lower cut-out portion 17 slidingly receives the hexagonal bar stock 30. When slide 13 is lowered to effect the shearing action, faces 21 and 29 cooperate to laterally constrain the bar stock against deformation adjacent the point of shearing.

The simplicity of rendering the shearing device capable of shearing different sizes of bar stock will become readily apparent from an examination of FIGURE 4. When it is desired to shear larger stock than that illustrated in FIGURES 1 and 2, it is necessary merely to remove set screw 28 and replace insert 25 with a smaller insert 25'. Inserts 25 and 25' are identical in all respects, except in the length of dimension "X–X'," having the same size depending portion 26 and projection 27. It will be readily apparent that by having a plurality of inserts with varying dimensions "X–X'," the shearing press may be rendered capable of shearing a large number of different sizes of bar stock without the necessity of removing the knife members.

In FIGURE 5, an embodiment of the invention is shown in which two pieces of hexagonal bar stock may be sheared simultaneously during one stroke of the slide. Cut-out portions 37 having substantially flat areas 38 are provided in upper and lower knife members 14 and 15. Recesses 39 are provided at intermediate areas of cut-out portion 37, and are provided with threaded holes 40 for reception of insert securing screws 48. Each end of cut-out portion 37 is provided with a face 41 disposed at an angle of 60° with respect to flat area 38. Inserts 45 are removably mounted in cut-out portions 37, and have depending key portions 46 seated in recesses 39. Each insert 45 is provided at its ends with a face 49 disposed at an angle of 60° with respect to flat area 38, and with a threaded hole 47 for reception of a socket head set screw 48. Faces 41 and 49 cooperate to laterally constrain the bar stock during the shearing operation.

Figure 6:
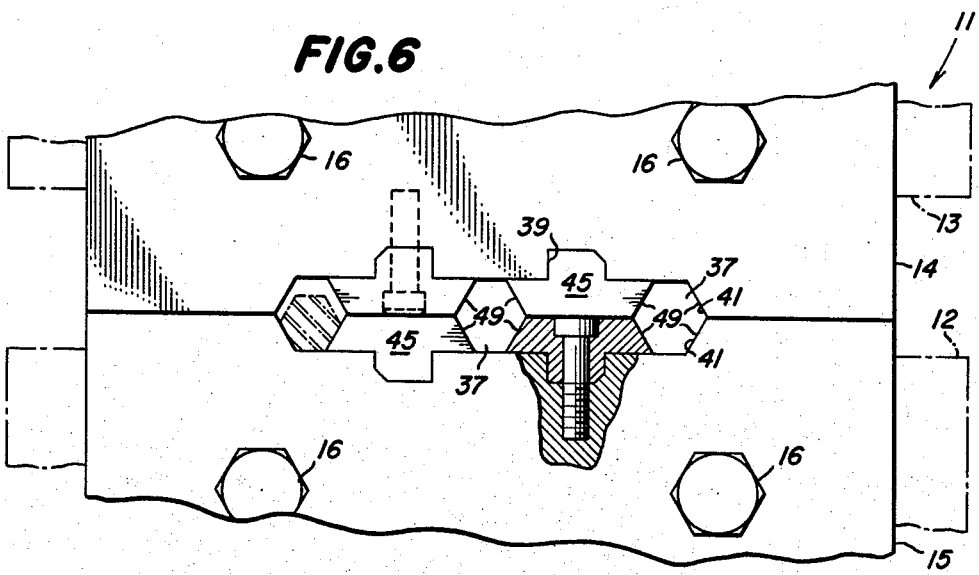
FIGURE 6 is a front elevational view partly in section of still another embodiment of the present invention.
Figure 7:
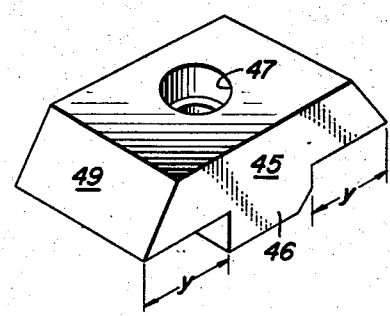
FIGURE 7 is a perspective detail view of one of the novel inserts used in the embodiments illustrated in FIGURES 5 and 6.

The embodiment of the invention illustrated in FIGURE 6 is similar to the embodiment illustrated in FIGURE 5 in that both embodiments employ identical inserts 45. However, it should be noted that in the embodiment illustrated in FIGURE 6 a plurality of inserts are provided at spaced-apart points along cut-out portions 37, thus making this embodiment capable of simultaneously shearing a plurality of bars. With particular reference to FIGURE 7, it should be noted that the shearing device illustrated in FIGURES 5 and 6 may be rendered capable of shearing bar stocks of different size by merely replacing insert 45 with another insert having a larger or smaller "Y" dimension.

Figure 8:
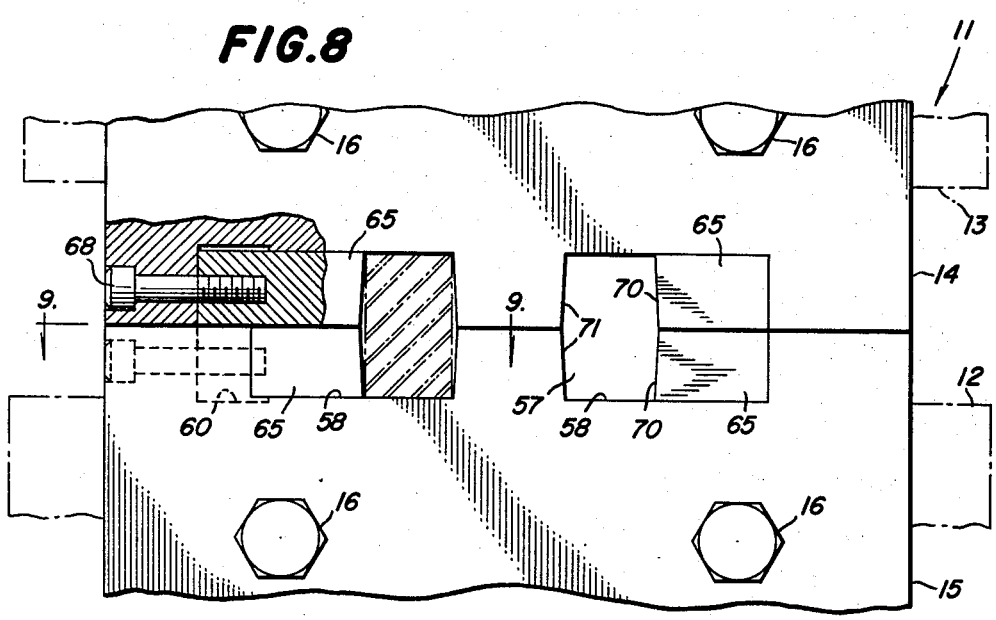
FIGURE 8 is a front elevational view partly in section of a still further embodiment of the present invention.
Figure 9:
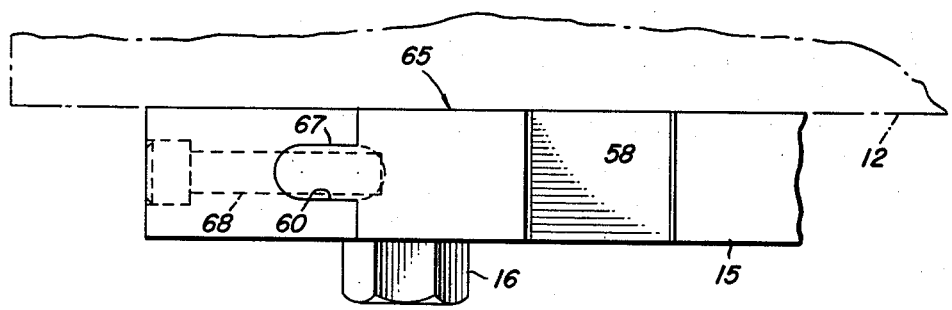
FIGURE 9 is a view taken along line 9—9 of FIGURE 8 with the bar stock removed.
Figure 10:
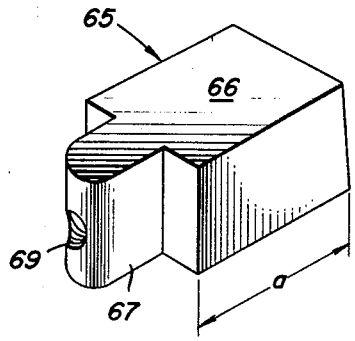
FIGURE 10 is a perspective detail view of one of the inserts used in FIGURES 8 and 9.

In FIGURE 8 through FIGURE 10 a further embodiment of the invention is disclosed which is particularly adapted to shearing square or rectangular bar stock. In this embodiment a pair of spaced-apart cut-out portions 57 are provided in upper and lower knife members 14 and 15, each having a substantially flat area 58, and a groove 60 at the end adjacent the side of the knife member. A substantially rectangular insert 65 is removably mounted in each cut-out portion 57, each insert having a flat face 66 seated against flat area 58, and a projection 66 seated within groove 60. Each insert 65 is provided with a threaded hole 69 for reception of a socket head set screw 68 to position and secure insert 65 in proper shearing relation to the bar stock. In this embodiment tapered face portions 70 of inserts 65 cooperate with the tapered faces 71 of cut-out portions 57 to laterally constrain the bar stock during the shearing operation. It should be understood that this embodiment of the invention can accommodate different sizes of bar stock by replacing insert 65 with another insert having a different length of dimension "A" as viewed in FIGURE 10.

It should be understood, of course, that the foregoing disclosure relates to only preferred embodiments of the invention, and that numerous modifications or alterations may be made therein without departing from the spirit and scope of the invention as set forth in the appended claims.

What is claimed is:

1. A device for shearing bar stock or the like comprising;
   (a) upper and lower knife members disposed in shearing relation to each other,
   (b) a cutout portion on each knife member,
   (c) said cutout portions being disposed in opposed facing relation,
   (d) a relatively flat recessed area on each cutout portion,
   (e) each area having a recess disposed therein,
   (f) each cutout portion being provided with a first shear face extending angularly from its recessed area,
   (g) an insert disposed in each cutout portion and being seated on said flat area,
   (h) said inserts each including a key portion disposed in said recesses,
   (i) a second shear face on each insert,
   (j) said second shear faces extending angularly with respect to said recessed areas,
   (k) said first and second shear faces being horizontally spaced with respect to each other and with portions of said flat areas providing a shearing opening for receiving a bar to be sheared,
   (l) means for moving said knife members relative to each other to affect shearing of a bar in said opening, and
   (m) means removably connecting said inserts in said cutout portions.

2. A device for shearing bar stock or the like comprising;
   (a) upper and lower knife members disposed in shearing relation to each other,
   (b) a cutout portion on each knife member,
   (c) said cutout portions being disposed in opposed facing relation,
   (d) a relatively flat recessed area on each cutout portion,
   (e) each cutout portion being provided with a first shear face extending angular from its recessed area,
   (f) an insert disposed in each cutout portion and being seated on said flat area,
   (g) a second shear face on each insert,
   (h) said second shear faces extending angularly with respect to said recessed areas,
   (i) said first and second shear faces being horizontally spaced with respect to each other and with portions of said flat areas providing a shearing opening for receiving a bar to be sheared,
   (j) means for moving said knife members relative to each other to affect shearing of a bar in said opening, and
   (k) means removably connecting said inserts in said cutout portions.

References Cited in the file of this patent

UNITED STATES PATENTS

| | | |
|---|---|---|
| 629,532 | Thomas | July 25, 1899 |
| 858,703 | Castle | July 2, 1907 |
| 2,380,898 | Pimentel | July 31, 1945 |
| 2,884,063 | Stover | Apr. 28, 1959 |